Aug. 18, 1936. W. T. PEASE Re. 20,071

GATE VALVE CONSTRUCTION

Original Filed Dec. 26, 1933

Inventor

William T. Pease

By Lyon & Lyon

Attorneys

Reissued Aug. 18, 1936

Re. 20,071

UNITED STATES PATENT OFFICE 20,071

GATE VALVE CONSTRUCTION

William T. Pease, Huntington Park, Calif., assignor to Snow Manufacturing Co., Los Angeles, Calif., a corporation of California Original No. 2,000,352, dated May 7, 1935, Serial No. 703,893, December 26, 1933. Application for reissue February 3, 1936, Serial No. 62,161

2 Claims. (Cl. 22—203)

This invention relates broadly to gate valves of the type used to regulate the flow of water under relatively low pressures such as are used in large numbers in irrigation systems.

A broad object of the invention is to provide a gate valve that is inexpensive to manufacture and yet has a long life and is not rendered inoperative or leaky by corrosion.

Gate valves of the type involved have commonly been constructed entirely of two or more pieces of galvanized sheet iron, by crimping or soldering the component parts together. Such valves have a short life, however, for the reason that the galvanizing coat is either damaged by the crimping or soldering operation during manufacture or soon wears away at the valve seat in use, thereby exposing the iron to the elements so that it quickly rusts.

In accordance with the present invention, the aforementioned defects are eliminated by forming the seat portion of the valve of a die casting metal which is joined in the casting operation to the galvanized iron part or parts of the valve. This provides a solid construction and at the same time eliminates the causes of corrosion, namely, damaged galvanizing and a galvanized valve seat member. The galvanizing coat on the sheet metal part or parts is not damaged during the die casting operations because the temperature to which the sheet metal is raised during the die casting is also lower than the fusing temperature of the galvanizing material on the sheet metal.

A full understanding of the invention may be had from the following detailed description which refers to the drawing:

Figure 1:
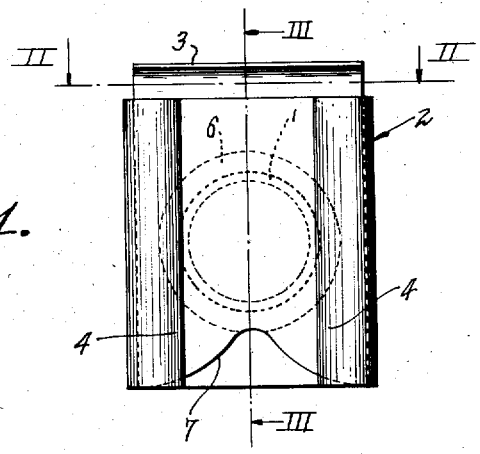
Fig. 1 is an end elevation view of a valve in accordance with the invention.

Referring to the drawing, the valve comprises a tubular member 1 of the die casting metal joined to a sheet metal gate supporting member 2 which is adapted to support a sheet metal gate 3 in sliding engagement with one end of the tubular member 1.

The gate supporting member 2 is preferably made of galvanized sheet iron and is provided with an aperture of slightly larger dimensions than the inside dimensions of the pipe member 1. The sides of the sheet member 2 are curled around, as shown at 4, to engage the outer surface of the gate 3. The sheet member of which the member 2 is constructed is sufficiently resilient to at all times maintain sufficient force against the gate 3 to hold it snugly against the end of the tubular member 1 while permitting the gate to slide up and down to cover the end of the pipe 1 to varying degrees to regulate the flow of water therethrough.

Figure 2:
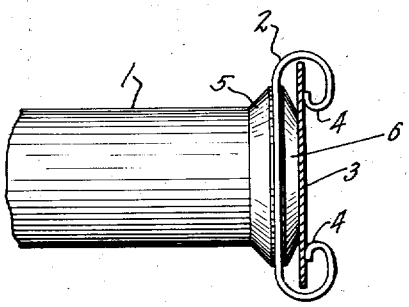
Fig. 2 is a plan view partly in section taken in the plane II—II of Fig. 1.
Figure 3:
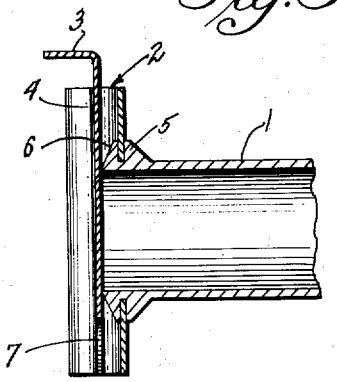
Fig. 3 is a longitudinal vertical section taken in the plane III—III of Fig. 1.

In the completed valve, as shown to best advantage in Fig. 2, the tubular member 1 is provided with an inner shoulder 5 and an outer shoulder 6 defining a circumferential groove into which the edges of the sheet member 2 fit snugly, whereby the member 2 is solidly supported over the complete circumference of the pipe member 1. The outer face of the outer shoulder 6 is preferably beveled as shown to provide a knife edge seat at the extreme end of the pipe 1 for engagement with the gate 3.

The valve is constructed by positioning a die casting mold about the sheet member 2 and casting the tubular member 1 in place, thus both forming the member 1 and uniting it to the member 2 in a single operation. As is well-known in the die casting art the heat of the die casting metal is dissipated by the dies so rapidly that casting direct to galvanized sheet material may be accomplished without injury to the galvanizing material on the sheet metal.

If desired, the die casting metal may be selected with a melting point lower than that of the galvanizing material and in either event the coating of the sheet metal member 2 is in no sense damaged during the casting operation, while, at the same time, the die casting metal in the ridges 5 and 6 is forced into intimate contact with the member 2 so as to grip it solidly and secure it rigidly upon the tubular member.

The side edges 4 of the member 2 may be curled into gate engaging position either before or after the pipe member 1 is formed although it has been found most convenient to perform this operation after the die casting operation.

Because of the fact that the die casting metal is relatively soft and the fact that the outer face of the flange 6 is beveled to a knife edge, this edge is quickly worn by the gate 3, when the valve is put in use, to a smooth seat conforming to the surface of the gate. This seat is therefore maintained during the entire life of the valve by virtue of the fact that the die casting metal is substantially non-corrodible in the presence of water and air.

The gate 3 may be made of any desired metal. It is commonly made of galvanized sheet iron because of its low cost. It is of little consequence whether or not this gate corrodes rapidly for the reason that it is very inexpensive and is therefore easily replaced.

Although the pipe member 1 has been shown as of circular shape, it is to be understood that the invention is not limited to this particular embodiment. The pipe member 1 and its seat may be made of any desired cross sectional shape and likewise the lower end of the gate 3 may be recessed. as shown at 7 in Fig. 1, or may be cut away in any other desired manner to control the shape of orifice produced with the valve in partly open position.

It is to be understood that although the invention has been described with reference to a particular embodiment that the details of construction may be varied which is to be limited only as set forth in the appended claims.

I claim:

1. That method of forming a gate valve consisting of die casting a pipe member having a lower melting point than zinc upon one side of a pre-formed galvanized iron gate supporting member having an aperture, and the forming of a seat, during the casting operation, for a gate valve on the side of the gate supporting member opposite to the side on which said pipe member has been formed.

2. That method of forming a gate valve consisting of die casting a pipe member upon one side of a pre-formed sheet metal gate supporting member having an aperture, and the forming of a seat during the casting operation, for a gate valve on the side of the gate supporting member opposite to the side on which said pipe member has been formed.

WILLIAM T. PEASE.